Feb. 11, 1969 M. S. GALLO 3,426,975

PORTABLE FOG SPRAYER

Filed March 15, 1967 Sheet 1 of 2

INVENTOR
MICHAEL S. GALLO
BY
Axel H. Johnson,

Feb. 11, 1969 M. S. GALLO 3,426,975

PORTABLE FOG SPRAYER

Filed March 15, 1967 Sheet 2 of 2

INVENTOR
MICHAEL S. GALLO
BY
Axel H. Johnson, 3,426,975
Patented Feb. 11, 1969

3,426,975

PORTABLE FOG SPRAYER

Michael S. Gallo, 1312 Forest St., Racine, Wis. 53404

Filed Mar. 15, 1967, Ser. No. 623,421
U.S. Cl. 239—341 3 Claims
Int. Cl. B05b 7/28, 7/00; A01n 17/02

ABSTRACT OF THE DISCLOSURE

A portable fog-sprayer for spraying insecticides, including a reservoir for the liquid insecticide, a compressor to provide air under pressure, and a nozzle having a plurality of atomizing orifices. The orifices are arranged in a pattern intended to assure a complete dispersion of the liquid particles so that the resulting vapor or mist remains in suspension, thereby increasing its effectiveness.

*Brief summary of the invention*

This sprayer is of the portable type and comprises a compressor which draws the insecticide liquid from the reservoir and atomizes the liquid at a plurality of orifices which are arranged in a group. The orifices are so arranged that mutual intermixing of the spray issuing therefrom produces a more complete breaking up of the liquid, thereby increasing its effectiveness. An example of a sprayer, of which the present invention is an improvement, is disclosed in the patent to Gallo No. 2,889,998.

The principal object of the present invention is to provide a portable sprayer that is powerful enough to spray a large area.

Another object is to provide a sprayer having a timing means to limit the amount of spraying at each location.

Another object is to provide a sprayer having a spray head having a preliminary pressure chamber that assures equal pressure at each orifice.

Another object is to provide a sprayer having a spray head having a plurality of orifices grouped so as to enlarge the area treated at each setting of the unit.

Another object is to provide a spray nozzle having a flared passageway to facilitate the initial atomizing of the insecticide.

Another object is to provide a sprayer having orifices so grouped as to assure a thorough dispersion of the particles of insecticide by an intermixing of the mist of each orifice with that of the adjoining orifice.

Additional objects and advantages will become apparent from the following description taken together with the annexed drawings, in which.

Figure 1:
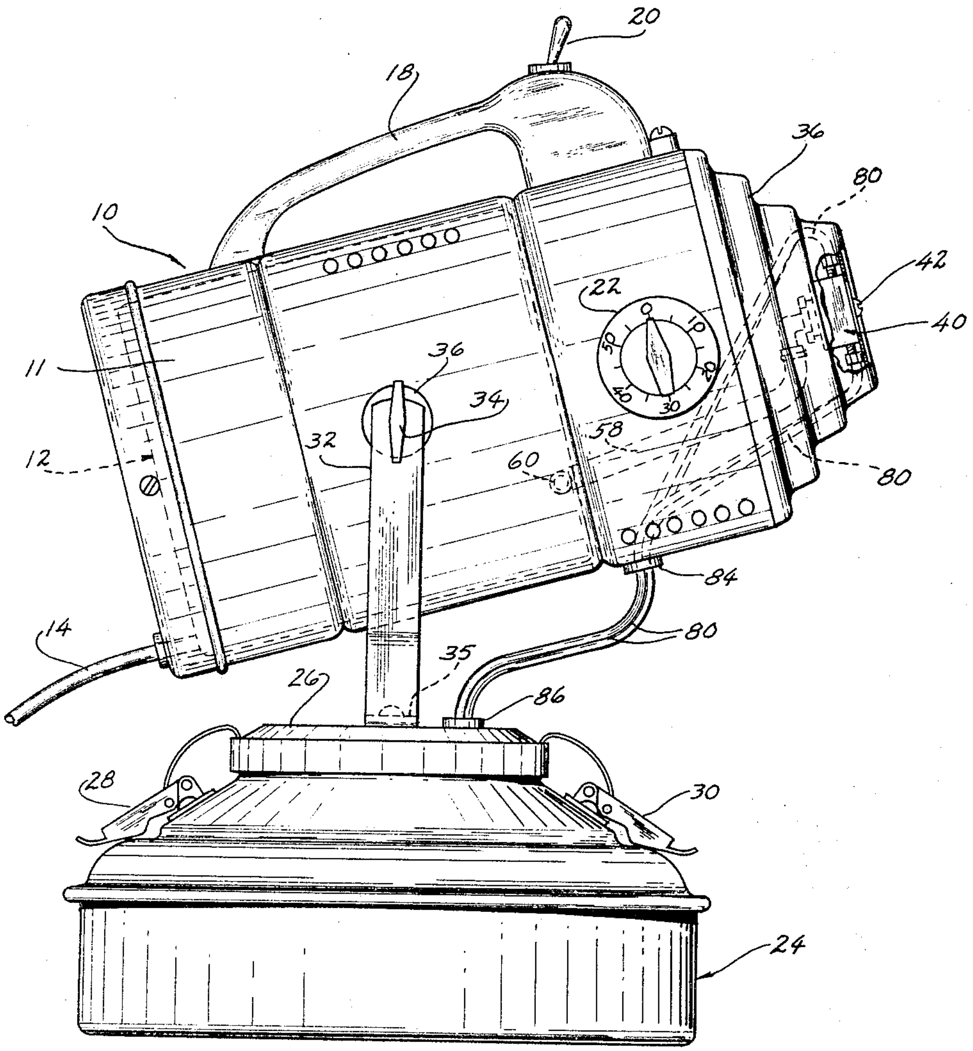
FIG. 1 is an elevational side view of a sprayer incorporating the invention.

As seen in FIG. 1, this sprayer comprises a spray unit 10 having a housing 11 which encloses an air compressor 12 shown in dotted lines: (This compressor is not shown in detail or further described as it is not a novel part of the present invention.) A conventional electrical power cord 14 provides the current to operate the compressor, and is plugged into a convenient outlet. The housing 11 is provided with a handle 18. A switch 20 is located in handle 18 at a convenient position. A timing unit 22 is provided which permits automatic stopping of the sprayer when it has operated a sufficient period of time.

Spray unit 10 is mounted upon an insecticide reservoir 24. A cover 26 is fitted to the top of reservoir 24, and is secured to the latter by conventional toggle clamps 28 and 30. A U-shaped bracket 32 embraces both sides of the spray unit 10, the latter being pivotally supported in the bracket by thumb screws such as 34, only one being shown. A pair of serrated washers 36 only one being shown are inserted between the unit 10 and the bracket 32 on each side of the unit to assure that the latter will remain on a set position. Washers 36 need not be further described as they are not a part of the invention. Bracket 32 has a transverse portion 35 which is secured to the surface of the cover 26 by any suitable means such as screws or rivets. A nose cap 36 is secured to the front end of housing 16 and is provided with an opening 38 as shown in FIG. 3.

Figure 2:
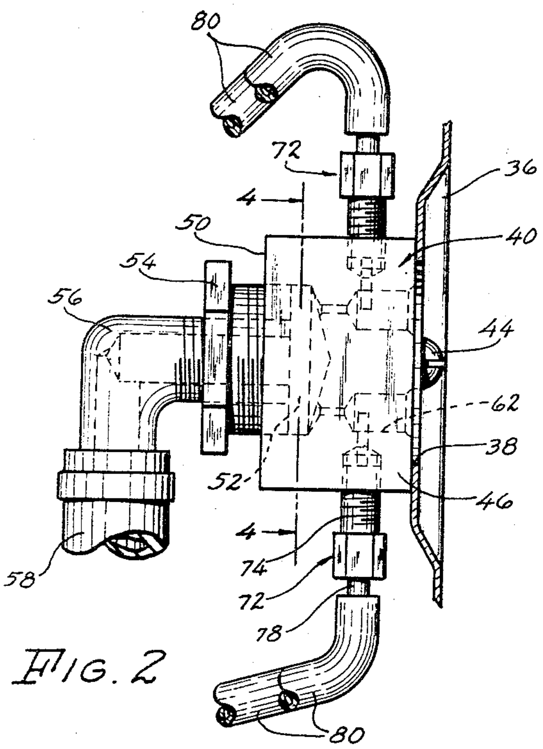
FIG. 2 is an enlarged fragmentary elevational view of a portion of FIG. 1, and embracing the novel nozzle head.
Figures 3, 5:
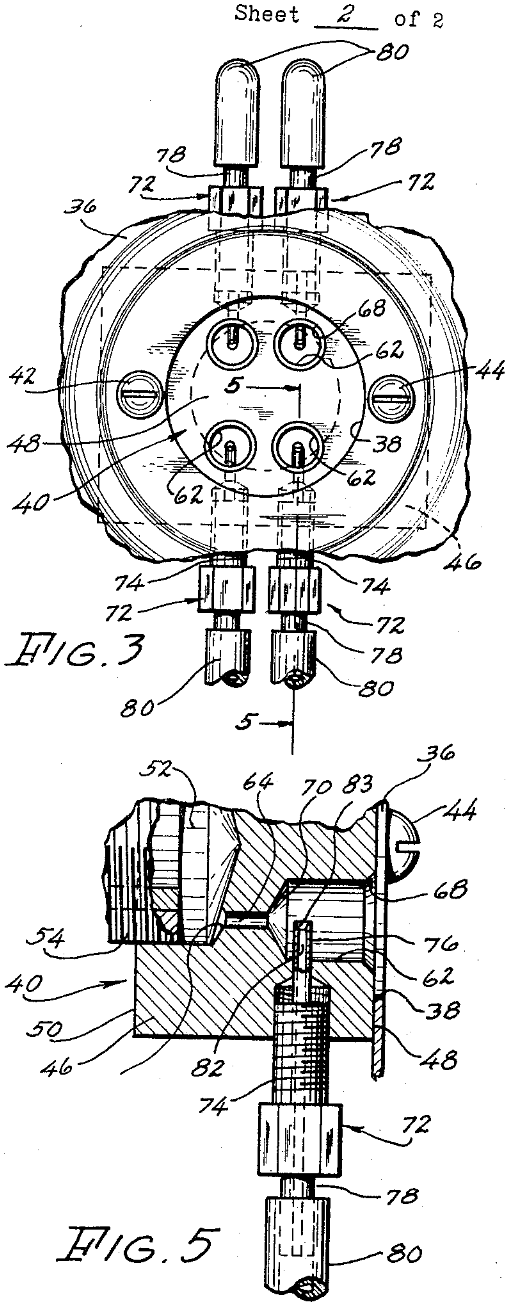
FIG. 3 is a front view of the nozzle head shown in FIG. 2.
FIG. 5 is a section taken at 5—5 of FIG. 3, but further enlarged in order to show details clearly.
Figure 4:
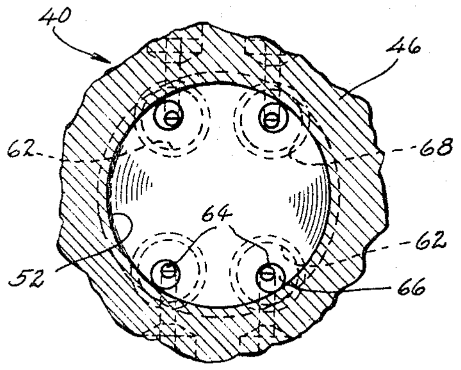
FIG. 4 is a section taken at 4—4 of FIG. 2, but slightly enlarged.

A spray head 40 is mounted within cap 36 as shown in FIGS. 2 and 3, being secured thereto by screws 42 and 44. Spray head 40 comprises a block 46 of metal in this instance. Block 46 has a front planar face 48 and a rear face 50. A rear cavity 52 is provided in the rear face 50 of block 46, as shown in FIGS. 2, 4 and 5. Cavity 52 is partially threaded to receive a reducer 54 which is threaded into the cavity a distance shown in FIG. 5; the remainder of the cavity serving as an equalizing air chamber. An elbow 56 or similar fitting is threadedly fitted in a suitable opening in reducer 54. A length of air hose 58 is secured in the usual manner to elbow 56. The other end of hose 58 is attached to the outlet 60 of the compressor 12. Thus air under pressure enters cavity 52. A plurality of front cavities 62 are provided in the front face 48, having the axes thereof normal to the face 48 and preferably arranged as shown in FIG. 3: In this instance, four such cavities are shown. However, a fewer or greater number of cavities may be provided, with a minimum of two cavities. A first passageway 64, co-axial with each of the cavities 62 connect the latter with common cavity 52, and are considerably smaller than the latter. Passageways 64 terminate in the cavity 52 in chamfers such as 66 of FIG. 5. Diverging chamfers or flares 68 are also provided about the peripheries of cavities 62 where the latter meet the front face 48. The inner ends of cavities 62 bottom in a cone, as at 70. A spray nozzle 72 is provided for each of the cavities 62. Nozzles 72 comprise a body portion 74 which is threadedly engaged in a bore provided in the block 46, and normal to the axes of the cavities 62 and positioned as shown. The threaded body portion 74 permits axial adjustment of the nozzles normal to the axes of the passageways 64. A tubular portion 76 extends into cavity 62 of each with the inner end of portion 76 positioned approximately at the axis of the cavity. Nozzles 72 terminate in a shank 78 which receives a length of plastic tubing 80. Nozzles 72 are provided axially with a passageway 82 to provide the means to convey the insecticide from the tubing 80 into the cavity 62. An initial means to aid in atomizing the insecticide is provided in the form of a flare 83 at the extreme end of the passageway 82 as shown in FIG. 5. The several lengths of tubing 80, which comprises four in this instance, are passed through a rubber bushing 84 provided in housing 11. Tubings 80 also pass through a bushing 86 located in the cover 26. Tubings 80 are of a length to reach to the bottom of the reservoir 24.

The novelty of this invention resides in the spray head 40. Air from the compressor is conveyed to the equalizing cavity 52 by the hose 58, through elbow 56. Passageways 64 are open to cavity 52, therefore, air entering passageways 64 is of equal pressure and velocity in all of these passageways. Likewise, the air entering each of the cavities 62 will flow at an equal pressure and velocity therethrough. Consequently, the liquid in each passageway 82 will flow at an equal velocity as it is drawn into the cavities 62. As the liquid flows from the passageway 82 the flare 83 produces the initial or primary step in atomizing the liquid, by permitting the latter to escape in the shape of a cone. Further atomization then takes place as the air, flowing through the first passageways 64 impinges against the partially-atomized liquid as it moves outwardly and axially from the cavities 62. As the mist passes outwardly from the front face 48, the flare 68 permits the flow to disperse divergently into a cone from each of the cavities 62. In view of the close proximity of the cavities 62 to each other, the cones of mist escaping from each cavity will intermix, resulting in a further atomizing of the liquid. The result being that the finer mist will remain in suspension for a longer, and therefore more effective period of time. Consequently, use of the sprayer embracing this invention will result in a more economical and efficient means of controlling insects such as flies, mosquitoes and similar insects.

What is claimed as new and desired to be secured by Letters Patent of the United States is:

1. In a sprayer, a spray head comprising, in combination a body portion having a front face defined by a plane, and a rear face spaced from said front face, said rear face being provided with a forwardly-directed rear cavity, means to supply air under pressure to said rear cavity, a plurality of rearwardly-directed cylindrical front cavities grouped in said front face and having axes normal to said front face, said front cavities communicating with said rear cavity by means of passageways, coaxial with said front cavities, said passageways being of a diameter substantially less than that of said front cavities, a spray nozzle extending into each of said front cavities, said nozzles terminating substantially at the axes of said passageways, directed substantially normal thereto and positioned forwardly of the junctures of said front cavities and said passageways.

2. A spray head in accordance with claim 1, in which said rear cavity is cylindrical, and said means to supply air under pressure to said rear cavity is threadedly engaged therewith.

3. A spray head in accordance with claim 2, in which said passageways are grouped so that the axes thereof are embraced by the periphery of said rear cavity.

References Cited

UNITED STATES PATENTS

| | | | |
|---|---|---|---|
| 840,917 | 1/1907 | Cramer | 239—341 |
| 2,705,171 | 3/1955 | Ziherl | 239—351 |
| 2,889,998 | 6/1959 | Jallo | 239—341 |
| 3,022,013 | 2/1962 | Bruinsma | 239—369 |

FOREIGN PATENTS

| | | |
|---|---|---|
| 916,662 | 8/1946 | France. |
| 452,357 | 10/1949 | Italy. |

EVERETT W. KIRBY, *Primary Examiner.*

U.S. Cl. X.R.

239—304, 369, 372